United States Patent [19]

Cecil et al.

[11] 3,997,757

[45] Dec. 14, 1976

[54] PROPORTIONAL CONTROL FOR GUIDANCE SYSTEMS, AND THE LIKE

[75] Inventors: Shelby Cecil, Medina; Dean D. Riggs, Avon Lake, both of Ohio

[73] Assignee: The Cecil Equipment Company, Medina, Ohio

[22] Filed: Aug. 19, 1974

[21] Appl. No.: 498,611

Related U.S. Application Data

[63] Continuation-in-part of Ser. No. 307,203, Nov. 16, 1972, Pat. No. 3,857,080.

[52] U.S. Cl. ........................... 219/124; 219/125 PL; 318/576; 318/653; 318/681
[51] Int. Cl.² .......................................... B23K 9/12
[58] Field of Search ......... 219/124, 125 R, 125 PL; 318/576, 653, 681

[56] References Cited

UNITED STATES PATENTS

| 3,425,047 | 1/1969 | Riggs | 318/576 X |
| 3,594,540 | 7/1971 | Weinfurt | 219/125 PL |

*Primary Examiner*—J. V. Truhe
*Assistant Examiner*—N. D. Herkamp
*Attorney, Agent, or Firm*—Cain and Henn

[57] ABSTRACT

Means to control the speed of correction of a probe, and a slave such as a torch or welding head, for a welding guidance system, and the like, wherein the response of the probe controls or actuates a device, which is responsive to a predetermined electrical condition, characteristic or information, to continuously vary the magnitude of the output of the device in proportion to the change or deviation detected by the probe to actuate at least one motor to correct or change the position of the probe and the slave.

8 Claims, 6 Drawing Figures

PROPORTIONAL CONTROL FOR GUIDANCE SYSTEMS, AND THE LIKE

CROSS-REFERENCE TO RELATED APPLICATION

This application is a continuation-in-part of applicant's co-pending application, Ser. No. 307,203, filed Nov. 16, 1972 now U.S. Patent No. 3,857,080.

BACKGROUND OF THE INVENTION

1. Field of the Invention

This invention relates to guidance systems and, more particularly, to guidance systems, such as are used in welding wherein a probe senses a welding path and then controls one or more positioning motors to position or change the position of the probe and the welding head to conform to the change or deviation detected by the probe.

2. Description of the Prior Art

Probes to detect a change or deviation in a path or welding seam are old and well-known in the art as shown, for example, in the Morehead U.S. Pat. No. 3,171,012.

Such probes have a shaft with a tip or sensing surface which engages the surface(s) defining the seam or joint and follows the same.

Changes or deviations in the path or seam are sensed by the tip and transmitted to appropriate switches operated by the remote end of the shaft, which switches turn a motor on or off to move the probe and/or the welding head in a direction, vertically and/or horizontally, as the case may be, to correct for the change or deviation sensed by the probe.

The switches either actuate or deactuate the positioning motor(s), i.e., turn them on or off, respectively, and when actuated, they operate at a single speed to position the probe and/or slave without regard to the magnitude or duration of the change or deviation detected.

While such probes and guidance systems exhibited marked improvement over systems known or suggested prior thereto, they have the disadvantage of not making proper corrections (and, therefore, proper welds) where a large correction or deviation is required, especially when of relatively short duration, i.e., short in the direction of longitudinal or basic travel of the probe and slave or welding head.

The last problem arises because the probe is over the deviation and signalling a new response before the slave has completed its correction for the prior deviation.

Similarly, if the change is of great magnitude, even if ultimately the new direction or result (correction) is utilized for some time, the response may be too slow and the slave may follow off course for some time, thus providing, for example, an inadequate, or, at least, not the best possible weld or other result.

SUMMARY OF THE INVENTION

It is, therefore, a general object of this invention to provide a new and improved guidance system.

It is a further object of this invention to provide a new and improved guidance system, suitable for use in or with welding apparatus, and the like, which corrects for deviations and changes in the path of advance with a speed which is proportional to the size or magnitude of the deviation or changes, and to provide such a new and improved guidance system wherein the speed of correction is continuously variable in proportion to the magnitude of the correction or deviation.

Still further objects of this invention include the provision of a new and improved guidance system, suitable for use with welding apparatus, and the like, wherein the path of travel of the slave, or seam to be followed by the welding head, is detected by a probe which signals any changes or deviations in the path to one or more positioning motors or means; which is a new and improved system; which provides a signal to the positioning motor or means, which is proportional to the magnitude of the change or deviation; which provides a signal for controlling the positioning motor or means of a slave apparatus, which is proportional to the magnitude of the change and which is continuously variable; which provides a signal for controlling the positioning motor or means of a slave apparatus, which is provided by a continuously variable device responsive to a predetermined electrical condition, characteristic or information; which provides a signal for controlling, which is continuously variable in proportion to the magnitude of the deviation or change detected; which can be utilized to position the slave and/or the detection device itself; and which provides a continuously variable and proportional signal for correcting the position of a slave, effecting correction in a horizontal and/or vertical direction and/or vector combinations thereof.

Still other objects of this invention include the provision of a new and improved guidance system having means for providing signal(s) to one or more positioning motors, wherein said signal is provided by a device which is continuously variable and responsive to a predetermined electrical condition, characteristic or information; which provides a continuously variable voltage signal; which provides a continuously variable voltage signal proportional to the magnitude of the change or deviation detected by the system; which provides a continuously variable electrical signal controlled by and in proportion to the movement of a magnet moving in proportion to and in response to the magnitude and direction of the change or deviation detected by the system in the path being followed by the system.

Still another object of this invention is to provide a new and improved guidance system obtaining one or more of the objects and advantages set forth above.

These and other objects and advantages of this invention will appear from the following description of preferred embodiments thereof, reference being had to the accompanying drawing.

DESCRIPTION OF THE PREFERRED EMBODIMENTS

Figure 1:
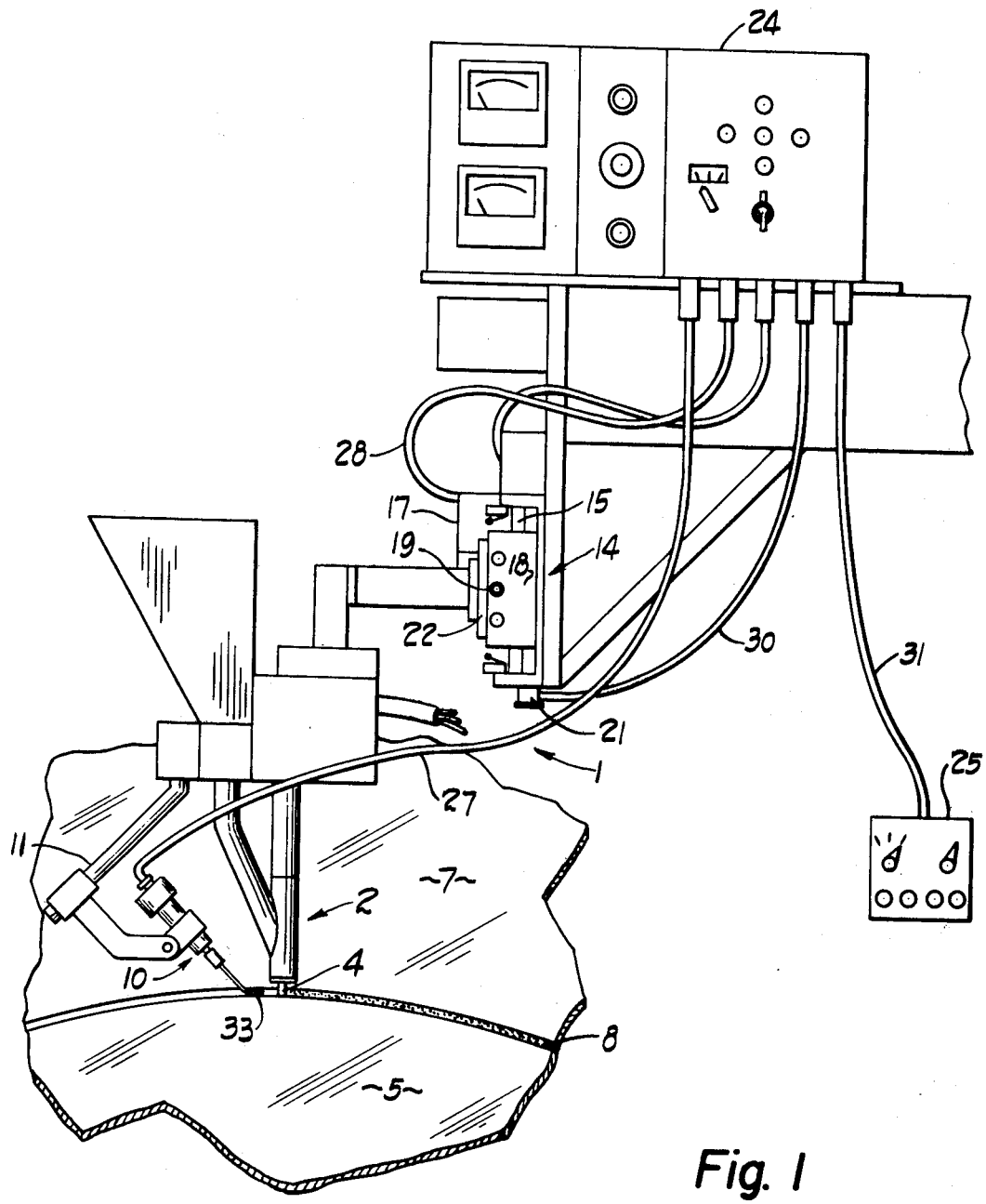
FIG. 1 is an elevational view, partly schematic, of a welding apparatus having a guidance system embodying this invention.

Welding apparatus including as a part thereof the means embodying this invention is indicated generally at 1, FIG. 1, and includes a welding head or torch 2 having a welding wire 4, the end of which is to be maintained on the welding seam or path formed in this example by the overlapping plates 5 and 7.

The plates have motion relative to the welding head and the bead 8 is formed as the torch passes along the path defined by the top surface of plate 5 and the lateral edge of plate 7.

Since the path or seam is not linear, a probe, indicated generally at 10 and to be hereinafter more fully described, precedes the torch upon which it is mounted by suitable means, such as the linkage or brackets 11, and detects the path or seam, originating necessary signals responsive to the changes and deviations of the path or seam, horizontal and/or vertical, to position the welding head tip and itself in accordance therewith.

To this end, the welding head is mounted on a cross-slide, indicated generally at 14, which conveniently and preferably is adapted to position the welding head both vertically and/or horizontally so that any change in either or both directions, or in a direction that can be vectorially divided into said components, can be compensated or corrected therefor.

To this end, cross-slide 14 includes a "fixed" plate carried on and movable with the apparatus 1 and supporting a vertically extending screw disposed behind the guide rod 15, which is driven by motor 17, hereinafter called a positioning motor, and is rotatable in both directions so as to either lower or raise the plate, not shown, which moves thereon and which supports the end plates 18 (one shown), which supports a second transversely extending screw thread 19 driven by a second positioning motor, tip shown at 21, and independently rotatable thereby to move the plate 22 in either direction, horizontally or laterally. The welding head 2 is mounted on plate 22 and thus the torch and probe may be moved vertically either up or down, as the case may be, to correct for changes or deviations in the surface of plate 5 as signaled by the probe 10 by the actuation of the positioning motor 17. The welding head and probe are moved laterally, in either direction, as the case may be, to correct for changes or deviations in the edge of plate 7 by rotation of screw 19 by the second positioning motor 21, also in response to a signal originated by the probe 10.

Apparatus 1 also includes suitable fixed and remote controls 24 and 25, respectively, and suitable electrical conduits 27, leading from the probe to the fixed control 24, 28 and 30, leading from the control 24 to the respective positioning motors 17 and 21, respectively, and 31 interconnecting the fixed and remote controls.

All of the above is old and, per se, forms no part of the present invention. Also, while the apparatus has been described as following a lap joint, it is to be recognized that apparatus including this invention as a part thereof may be used to weld other types of joints and as a control for other types of apparatus and slave mechanisms.

As disclosed herein, probe 10 and its sensing surface or tip 33 takes the general form and shape disclosed in the Morehead patent referred to above and includes a shaft 34 which extends from the sensing tip 33 and has an upper end 35 which in the Morehead patent actuates the switches which control the positioning motor, which, in turn, when so actuated operate the cross-slide at a single, predetermined speed to effect correction and change the position of the welding head and probe in accordance with the response of the tip 33 as reflected at the upper end 35 of shaft 34.

In this instance, however, probe 10 is adapted to provide a continuously variable signal of a predetermined electrical condition, characteristic or information, which is proportional to the magnitude, as well as direction, of the change or deviation, horizontal and/or vertical or vector components thereof sensed by the probe tip in the path being tracked and which actuates the appropriate positioning motor or motors to operate the screw shafts of the cross-slide to effect the correction or repositioning of the welding head at speeds proportional to the magnitude of the change or deviation sensed by the tip 33, to and for the advantages, purposes and objects noted above.

Figure 2:
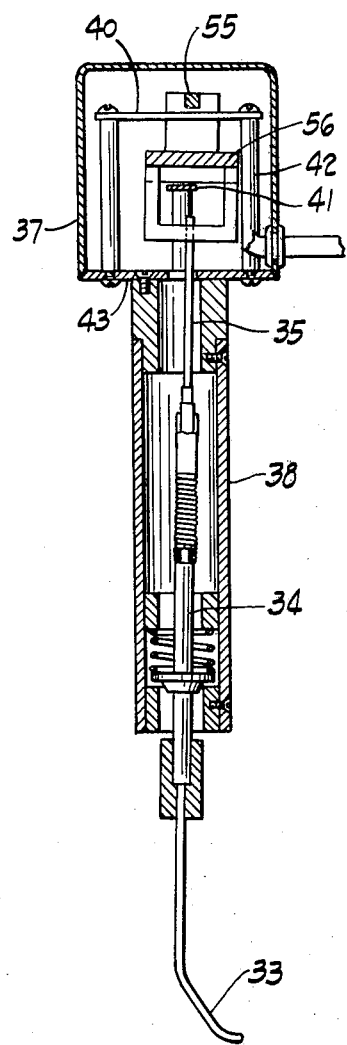
FIG. 2 is a vertical section of a probe embodying a preferred form of this invention.
Figure 3:
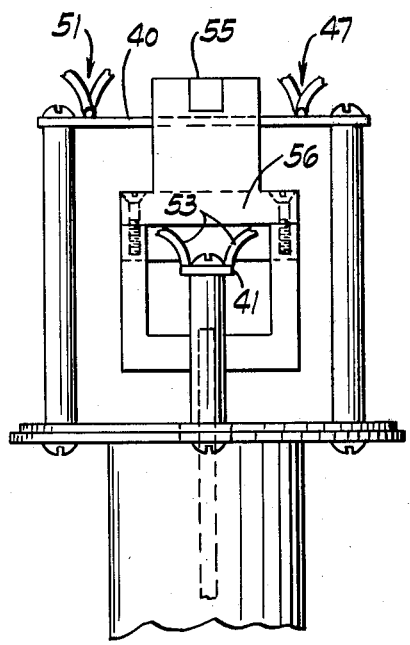
FIG. 3 is an enlarged, elevational view of the top of the probe shown in FIG. 2 with the cover removed, showing a preferred form of continuously variable source of electrical information embodying this invention.

To this end, the upper end 37 of the housing 38 of probe 10 is provided with two fixed platforms, 40 and 41, respectively, which are disposed at 90° to each other and so that one, 40, for example, is parallel with the direction of travel of the upper end 35 of shaft 34 when tip 33 moves in a vertical direction and the other, 41, is parallel with the direction of travel of upper shaft end 35 when the tip 33 moves in a horizontal direction. Platforms 40 and 41 are supported by means such as posts 42 on a plate 43 affixed to or carried by the probe housing 38 so that the platforms 40 and 41 are spaced axially, relative to the shaft, but overlie each other as best seen in FIGS. 2 and 3.

Each of the platforms 40 and 41 contains a Hall voltage generator cell, 45 and 46, respectively, at its midpoint. Each cell, 45 and 46, has an input circuit connection, 47 and 48, respectively, and a variable output circuit connection, 51 and 53, respectively, in which the voltage varies in proportion to the effect of a variable magnet moving over the cell, in accordance with the principles of the Hall affect.

To this end, two permanent magnets 55 and 56 are supported at 90° to each other on the upper end 35 of shaft 34. One Magnet 55 is disposed in operable relation with cell 45 carried on platform 40 and is adapted to move across or along the longitudinal axis or extent of cell 45 in response to vertical movement of tip 33. The magnitude of the deviation or change detected by the tip 33 is reflected in the magnitude of travel of the magnet 55 and that travel, in turn, effects the amplitude of the voltage output of the cell 45, such amplitude being proportioned to the vertical vector, i.e., movement of tip 33 of any change or deviation sensed or required.

Figure 4:
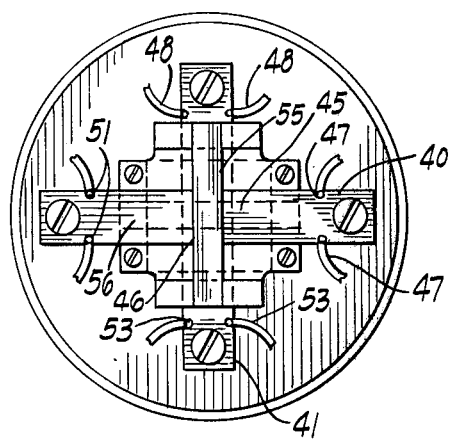
FIG. 4 is a top plan view of the source shown in FIG. 3.

Further, platforms 40 and 41 and magnets 55 and 56 are so supported and arranged physically relative to each other (see FIGS. 3 and 4) that each magnet may move in its effective direction even though the other also be moved in its effective direction. As a consequence, as indicated above, changes or deviations which are, in effect, the vector result of horizontal and vertical directions, may be detected and corrected by proper operation, i.e., speed of both positioning motors.

The motion or direction of travel of the magnet 55 from its neutral or null position at the midpoint of the Hall cell also determines the direction of the voltage change and, therefore, whether the positioning motor operates in the direction to raise or lower the welding head and probe.

Magnet 56 is similar to magnet 55, but is disposed in operable relation with cell 46 and moves longitudinally thereof to reflect changes and deviations detected by the tip 33 which are in a horizontal direction and causes corrections therefor by operation of the corresponding positioning motor in the same manner as magnet 55 causes correction for vertical changes or deviations by controlling the vertical positioning motor.

Thus, it is seen that the probe of this invention puts out a signal which is a continuously variable electrical condition, characteristic or information and is in proportion to the magnitude of and in the direction necessary to correct for the change or deviation detected by the probe tip 33.

Accordingly, the signal emanating from the probe actuates the positioning motor or motors, as the case may be, to position or, more accurately, reposition the probe and welding head to correct for the change or deviation detected by the probe at a speed which is proportional to the magnitude of the change or deviation and in the direction or directions (vector of horizontal and vertical deviations or changes) required to effect the change or correction desired.

Figure 5:
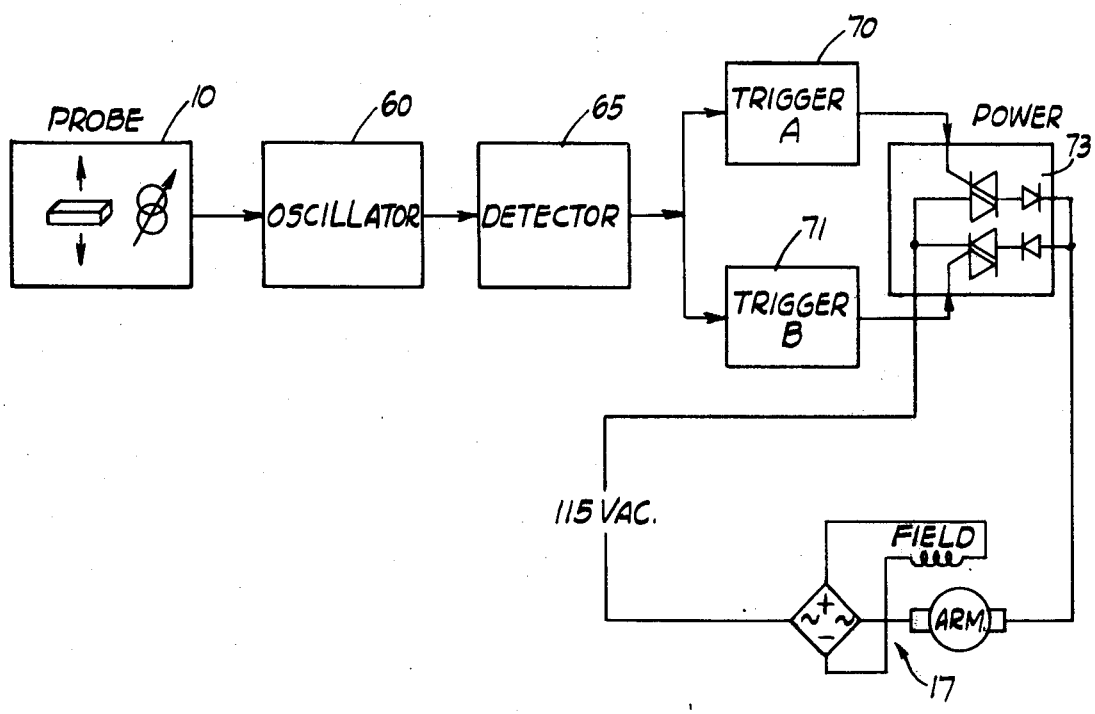
FIG. 5 is a block diagram of the control system, for control in one plane, for the source shown in FIGS. 3 and 4.

More particularly, as shown diagrammatically in FIG. 5, the variable signal generated in the probe, for corrections in one direction (vertical or horizontal) and proportional to the magnitude of the change or deviation detected by the probe tip in that direction, is transmitted to and modulates the output of the oscillator circuit 60 so that changes in the amplitude of the oscillator output voltage are proportional to the changes or deviations detected.

Further, while only one circuit for correction in one direction, vertical or horizontal, is shown in FIG. 5, it is to be understood that a second similar circuit is provided for correction in the other direction. Corrections in the vertical direction may, of course, be either up or down and those in the horizontal direction may be either left or right.

The output of detector circuit 65 is a variable D.C. voltage having a null value which represents the null or center position of the probe tip. Shifting of the probe tip in either direction, up or down, or left or right, as the case may be, produces a change in the output voltage of detector circuit 65 in proportion to the magnitude of the shift or deviation and in the direction necessary to effect the desired correction. The signal from the detector circuit affects the appropriate trigger circuit, A or B, 70 or 71, respectively, depending on the direction, up or down, or left or right, the probe and welding head are to be moved.

The affected trigger circuit controls the power circuit 73 to actuate the positioning motor, indicated as horizontal positioning motor 17, to turn the screw thread in the appropriate direction to properly position or reposition the probe and welding head at a speed in proportion to the magnitude of the deviation.

Figure 6:
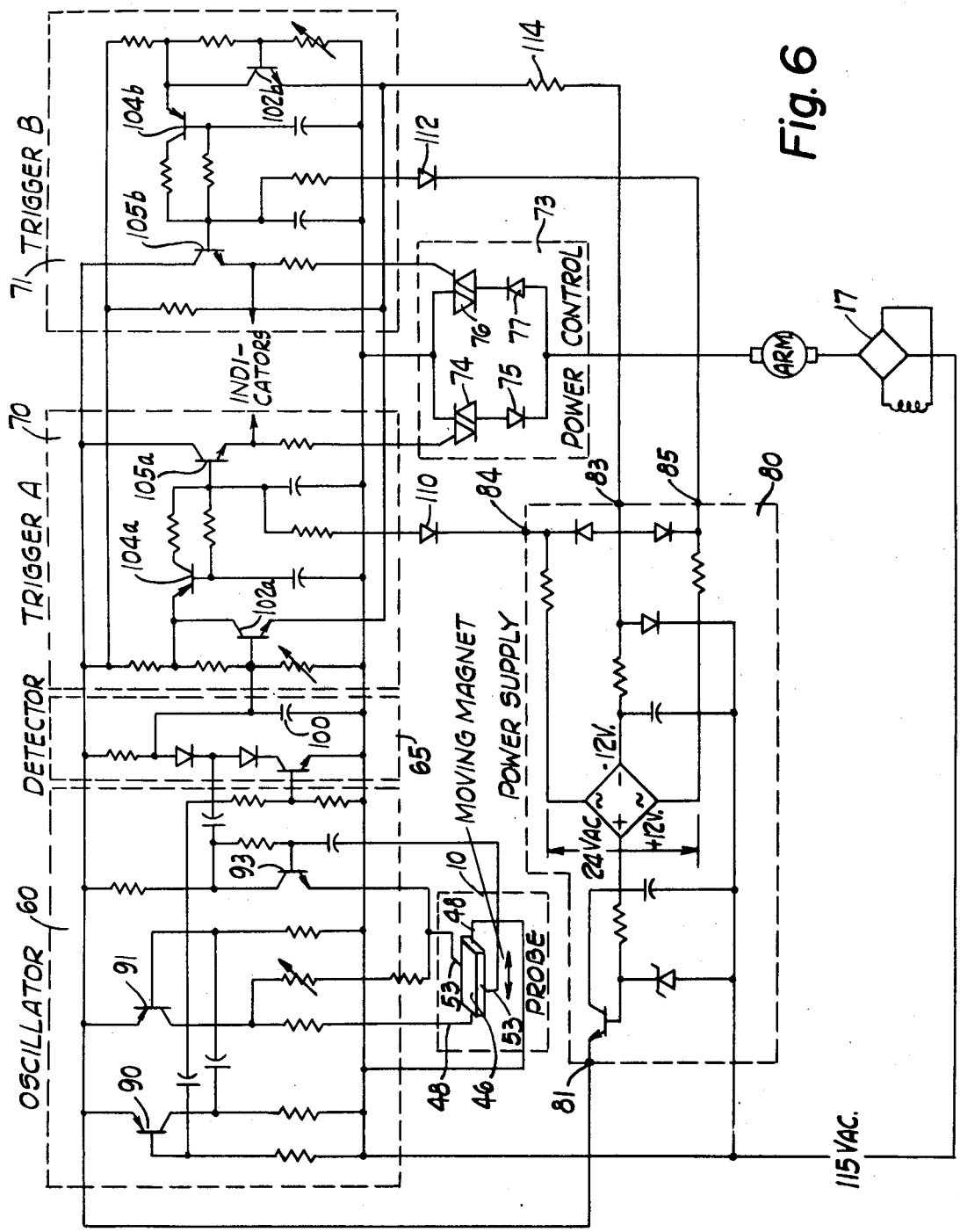
FIG. 6 is a schematic wiring diagram for the source shown in FIGS. 3 and 4 and its control system shown in FIG. 5, for control in one plane.

A circuit appropriate for accomplishing the objects and purposes of the circuit shown diagrammatically in FIG. 5 is shown in FIG. 6. Again, the circuit shown in FIG. 6 is appropriate for either vertical or horizontal correction. Apparatus embodying this invention is, in fact, preferably provided with two such circuits so that corrections can be made for vertical and/or horizontal changes or deviations detected by the probe tip. The circuit of FIG. 6 will be described as applied to horizontal corrections.

In FIG. 6 the horizontal positioning motor 17 is connected across the power line to receive rectified current through power control circuit 73 in the proper direction to cause the motor to compensate for deviations detected by probe 10. The magnitude of current supplied to the motor is proportional to the magnitude of the detected deviation and determines the speed of compensation for the deviation.

Current is supplied in one direction to positioning motor 17 through a triac 74 and diode 75 and in the opposite direction through triac 76 and diode 77. The average value of current supplied to the positioning motor and, therefore, the speed of compensation is determined by the point in each cycle of supply voltage to triacs 74 and 76 at which the appropriate triac is triggered into conduction. The average value of current is higher as the triggering point approaches the beginning of each supply voltage cycle. In the balanced condition of probe 10 no current is provided to positioning motor 17. When a change or deviation in a welding seam path of the probe is detected by probe 10, trigger signals are generated by either trigger circuit 70 or trigger circuit 71 to fire either triac 74 or triac 76 so that positioning motor 17 will be caused to move the welding head in a direction to compensate for the deviation and at a rate proportional to the magnitude of the deviation.

The power line also energizes a power supply generally indicated at 80. Power supply 80, per se, is conventional and will not be described in detail. A positive supply voltage is produced at terminal 81 and a negative supply voltage at terminal 83. Sinusoidal voltages opposite in phase are produced at terminals 84 and 85. These voltages are supplied to the oscillator, detector and trigger circuits as described below.

Oscillator 60 includes an astable or free-running multivibrator comprising transistors 90 and 91 and an amplifier circuit including transistor 93. The horizontal correction Hall generator 46 has its input connections 48 connected in the collector circuit of transistor 91 to be supplied with current therefrom. The output connections 53 of Hall generator 46 are connected between the emitter and base of transistor 93.

A Hall generator, as is well-known, produces a voltage output proportional to the product of the current supplied to it and the intensity of the magnetic field applied perpendicular to it. As illustrated for the preferred embodiment of the present invention, a magnet, in this case horizontal position detecting magnet 56, is positioned with respect to Hall generator 46 such that, in the null position of probe 10 the magnetic field intensity applied to the Hall generator is approximately one-half of the maximum intensity provided to the Hall generator when the magnet is positioned directly opposite thereto. Since the current supplied to the Hall generator is essentially constant any change in the Hall generator output voltage from the null value is proportioned to the magnitude of change of position of magnet 56 with respect to the Hall generator. The direction of the output voltage change indicates the direction of movement of magnet 56 and the direction of the detected horizontal deviation. Thus, changes in the output voltage of the Hall generator indicate both the direction and magnitude of changes or deviations detected by probe 10.

The high frequency signal from transistor 91 is coupled to the emitter of transistor 93. The oscillator signal is combined with the voltage signal from Hall generator 46 and the combined signal is transmitted by transistor 93 to detector 65. In detector 65 the high frequency signal is removed from the combined signal to recover the information signal from Hall generator 46. The information signal appears across capacitor 100 and is a D.C. voltage which varies about a null value according to the magnitude and direction of deviations detected by probe 10.

The position signal across capacitor 100 is supplied to and controls trigger circuit 70 which in turn controls trigger circuit 71. Trigger circuits 70 and 71 are arranged so that if one is fired the other cannot be fired. This is essential since the two trigger circuits direct power control circuit 73 to supply current in opposite directions to positioning motor 17. Each trigger circuit includes a control transistor 102a, 102b, respectively, a delay transistor 104a, 104b, respectively, and a trigger transistor 105a, 105b, respectively. Delay transistor 104a is supplied through a diode 110 with a negative going half cycle of voltage appearing at terminal 84 of power supply 80. Delay transistor 104b is similarly supplied through diode 112 with a negative half cycle of voltage from terminal 85 of power supply 80. The half cycles of voltage supplied to transistors 104a and 104b are opposite in phase. Trigger transistors 105a and 105b are connected between the respective delay transistors 104a and 104b and the respective triacs 74 and 76. A trigger transistor is rendered conductive and triggers the respective triac into conduction when the respective delay transistor is turned on.

The opposite phase half cycles of voltage from power supply 80 are provided as base and collector voltage supplies to the respective delay transistors 104a, 104b. Each delay transistor will be rendered conductive at the point in the half cycle of voltage supplied thereto at which its base becomes negative with respect to its emitter. The signal levels at the emitters of the delay transistors 104a, 104b are controlled by the respective control transistors 102a, 102b. The control transistors share a common emitter resistor 114 which is returned to a negative potential at terminal 83 of power supply 80.

Each control transistor 102a, 102b is biased so that at the null value of voltage from detector 65 it will be operating in its conductive region about midway between saturation and cutoff. At the null value the control transistors are conducting sufficiently that the voltage levels at the emitters of delay transistors 104a and 104b are more negative than the most negative portions of the half cycles of voltage at the respective bases of the delay transistors. Under this condition delay transistors 104a and 104b are not conductive and power circuit 73 is not triggered to supply current in either direction to positioning motor 17.

A deviation in one direction detected by probe 10 is translated into an increase in the voltage across capacitor 100 in detector 65. The voltage increase drives control transistor 102a further into conduction and reduces the voltage level at the emitter of delay transistor 104a thus driving the delay transistor nearer a nonconductive state. Increased current in control transistor 102a, however, flowing through common emitter resistor 114 increases the voltage level at the emitter of control transistor 102b in trigger circuit 71 and drives that transistor to a less conductive state. Decreased conduction by transistor 102b increases the voltage level at the emitter of delay transistor 104b so that the negative going half cycle of voltage at the base of transistor 104b will at some point become more negative than the emitter. At this point the transistor 104b will be rendered conductive and turn on transistor 105b which will fire triac 76 and supply current to positioning motor 17.

It will be noted that a larger increase in the voltage across capacitor 100 produces proportionately greater conduction by control transistor 102a which in turn produces proportionately less conduction by control transistor 102b and a proportionately higher voltage level at the emitter of transistor 104b. The higher emitter voltage level causes transistor 104b to conduct earlier in the negative half cycle of supply voltage and fire triac 76 correspondingly earlier to increase the average value of current supplied to positioning motor 17. The speed of the correction applied by positioning motor 17 is thus proportional to the magnitude of the detected deviation.

A deviation in the seam in the direction opposite to that mentioned above is translated by probe 10 and oscillator 60 into a decrease in the voltage level across capacitor 100. The decreased level tends to render control transistor 102a less conductive and thereby increases the voltage level at the emitter of delay transistor 104a. The delay transistor 104a will then be rendered conductive at a point in the negative half cycle of supply voltage when its base becomes negative with respect to its emitter. Triac 76 will be fired at this point in each half cycle of voltage supplied thereto. As the correction process proceeds the voltage across capacitor 100 will rise gradually toward the null value and triac 74 will be fired progressively later in each voltage half cycle until finally the detected deviation is fully compensated.

It will be noted also that decreased conduction by control transistor 102a tends to increase the forward bias of control transistor 102b and drive delay transistor 104b of trigger circuit 71 further into the nonconductive state. Thus, operation of one trigger circuit tends to lock out the other so that triacs 74 and 76 cannot be triggered simultaneously.

To summarize the operation of the circuit of FIG. 6, so long as probe 10 detects no deviations in the seam to be welded, neither triac 74 nor triac 76 will be rendered conductive and positioning motor 17 will not be energized. A deviation detected by probe 10 will cause magnet 56 to move closer to or further from Hall generator 46 depending upon the direction of the deviation. This will cause an increase or decrease in the output voltage from Hall generator 46 which, in turn, will produce an increase or decrease in the voltage across capacitor 100 in detector 65 as described above. The increase or decrease in the capacitor voltage will cause a trigger signal to be produced by either trigger circuit 70 or trigger circuit 71 to fire either triac 74 or triac 76 at a particular point in each half cycle of voltage thereto. Current will be provided through the appropriate triac to positioning motor 17 having an average value proportional to the magnitude of the detected deviation. Positioning motor 17 will position the welding head in the proper direction to compensate for the detected deviation and at a rate proportional to the magnitude of the deviation.

It will be appreciated also that a second circuit identical to that of FIG. 6 may be provided for compensating for deviations in the seam probe path in the vertical direction. The two circuits may act simultaneously to compensate for deviations that are combinations of deviations in the horizontal and vertical directions.

Modifications, changes and improvements to the preferred form of the invention herein disclosed, described and illustrated may occur to those skilled in the art who come to understand the principles and precepts thereof. Accordingly, the scope of the patent to be issued hereon should not be limited to he particular embodiment of the invention set forth herein, but rather should be limited by the advance by which the invention has promoted the art.

We claim:

1. A probe or master for guiding a slave or associated apparatus along a path, said probe comprising a housing, a shaft extending longitudinally in said housing, a sensing tip carried on said shaft and adapted to engage said path and to detect vertical and horizontal changes and deviations therein, pivot means supporting said shaft, intermediate its length for pivoting about two axes at right angles to each other, and means supported by said housing and shaft, and having relative motion between portions thereof supported on said housing and shaft, respectively, for providing an electrical characteristic output in proportion to the magnitude and direction, both vertical and horizontal, respectively, of the change or deviation in said path detected by said sensing tip.

2. The probe or master according to claim 1 in combination with a slave apparatus including motor means for positioning said slave, said motor means being controlled by said electrical output to operate at a speed and direction to effect said positioning at a speed proportional to the magnitude of the change or deviation sensed or detected and in the direction to correct therefor.

3. The apparatus according to claim 2 in which said slave is a welding head.

4. The apparatus according to claim 3 in which said probe is supported on said welding head.

5. The apparatus according to claim 1 in which said output is a variable voltage.

6. The apparatus according to claim 1 in which said means for providing an electrical characteristic output includes a controllably conductive path and the conduction thereof is varied in proportion to the magnitude of the change or deviation detected by said tip.

7. The apparatus according to claim 1 in which said means for providing an electrical characteristic output comprises a permanent magnet and a Hall cell with one of said permanent magnet and said Hall cell supported on said housing and the other supported on said shaft whereby said magnet and Hall cell are disposed to have motion relative to each other in proportion to the movement of said tip.

8. The apparatus according to claim 7 in which there are two said Hall cells and magnet means oriented at 90° to each other.

* * * * *